United States Patent
Shimoda

[11] Patent Number: 6,122,120
[45] Date of Patent: Sep. 19, 2000

[54] RECORD REPRODUCTION APPARATUS

[75] Inventor: Kaneyasu Shimoda, Kawasaki, Japan

[73] Assignee: Fujitsu Limited, Kawasaki, Japan

[21] Appl. No.: 09/150,368

[22] Filed: Sep. 9, 1998

[30] Foreign Application Priority Data

Feb. 17, 1998 [JP] Japan .................................. 10-035053

[51] Int. Cl.[7] ...................................................... G11B 5/09
[52] U.S. Cl. .................................. 360/46; 360/65; 375/232
[58] Field of Search .................................. 360/65, 46, 40, 360/51; 375/229, 230, 231, 232, 262, 341

[56] References Cited

U.S. PATENT DOCUMENTS

| | | | |
|---|---|---|---|
| 5,150,379 | 9/1992 | Baugh et al. | 375/232 |
| 5,287,385 | 2/1994 | Sugawara et al. | 360/65 X |
| 5,550,683 | 8/1996 | Koren | 360/46 |
| 5,689,532 | 11/1997 | Fitzpatrick | 375/341 |
| 5,917,862 | 6/1999 | Shimoda | 375/341 |
| 6,046,874 | 4/2000 | Takahashi | 360/65 |

FOREIGN PATENT DOCUMENTS

| | | |
|---|---|---|
| 61-154209 | 7/1986 | Japan . |
| 546908 | 2/1993 | Japan . |
| 06124542 | 5/1994 | Japan . |
| 07230670 | 8/1995 | Japan . |
| 07296524 | 11/1995 | Japan . |
| 08087828 | 4/1996 | Japan . |
| 08263890 | 10/1996 | Japan . |

*Primary Examiner*—Alan T. Faber
*Attorney, Agent, or Firm*—Greer, Burns & Crain, Ltd.

[57] ABSTRACT

A recording unit converts input data into a (1, 7) RLL code by a (1, 7) RLL encoder to record it onto a medium. A reproducing unit equalizes a regenerative signal from the medium by use of a transfer function $(1+D)(1+1.5D+D^2)$ of an equalizer 44. After the limitation to a narrow band up to a spectrum null by a lowpass filter, the reproducing unit detects data by a maximum likelihood detector and decodes original data from (1, 7) RLL code data by means of a (1, 7) RLL decoder.

11 Claims, 18 Drawing Sheets

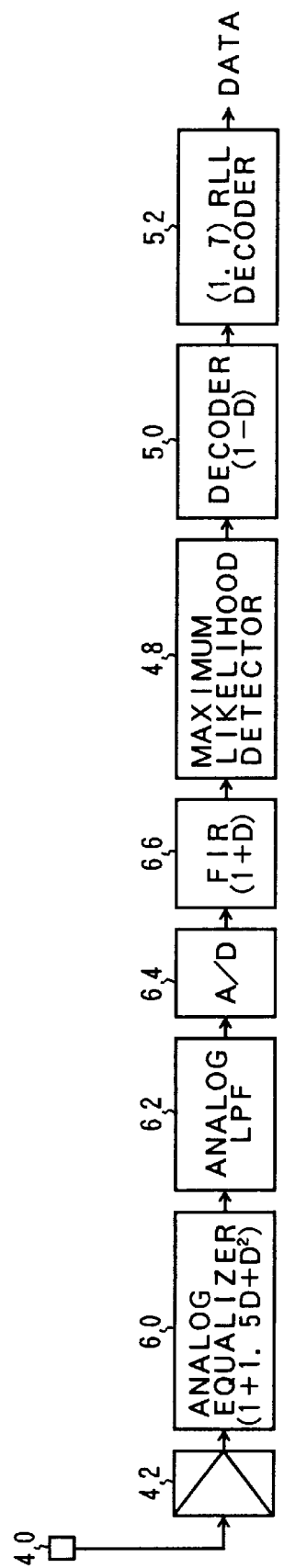
F I G. 5

RECORD REPRODUCTION APPARATUS

BACKGROUND OF THE INVENTION

1. Field of the Invention

The present invention relates generally to a record reproduction apparatus which targets a magnetic recording system of a partial response using a (1, 7) RLL code, and more particularly to a record reproduction apparatus for recording and reproducing information onto/from a magnetic recording system represented by a partial response system.

2. Description of the Related Arts

With a recent trend toward diminishment in size of magnetic particles of a medium attendant on a high density recording, there is increasing a demand for a recording method preventing information from erasing due to a heat relaxation. To this end, a method has been provided in which the recording frequency is reduced by use of a (1, 7) RLL code having a run length limited to between 1 to 7, although due to the extension of the recording band as a result of a poor encoding efficiency, there is a need for a combination with an equalization method having a high resistance to a high line recording density.

A conventional equalization using the (1, 7) RLL code employs for instance a (1, 7) EEPR4 (Expanded—Expanded Partial Response Class 4) which is a combination of a (1, 7) RLL code having an encoding rate of $\frac{2}{3}$ and a partial response PR (1, 2, 0, -2, -1) or a (1, k) MEEPR4 (Modified Expanded—Expanded Partial Response Class 4) which is a combination of a (1, k) RLL code having an encoding rate of $\frac{2}{3}$ and a partial response PR (1, 1, 0, -1, -1). Here, if k=7 in the (1, k) MEEPR4, a (1, 7) MEEPR4 having an encoding rate of $\frac{2}{3}$ results. Since its high frequency components are enhanced due to as large a sampling amplitude value as ±2, such a conventional (1, 7) EEPR4 has a low resistance to the high line recording density. In addition, the (1, 7) MEEPR4 is liable to cause a catastrophic code (undefined code) at the encoding rate of $\frac{2}{3}$, so that the encoding rate must be reduced in order to obviate the occurrence of the catastrophic code. This results in a problem that the encoding efficiency may be lowered due to the complication of the encoding and the decoding. Furthermore, an increase of the longest 0 consecutive (k) value to a value exceeding k=7 to obviate the occurrence of the catastrophic code may disadvantageously lead to a poor error rate.

SUMMARY OF THE INVENTION

According to the present invention, there is provided a record reproduction apparatus executing a narrow band partial equalization using a (1, 7) RLL code, having a less treble enhancement and allowing easy encoding and decoding.

The present invention is directed to a record reproduction apparatus for recording and reproducing information on/from a magnetic recording system represented by a partial response system. The apparatus has a recording unit and a reproducing unit. The recording unit comprises a (1, 7) RLL encoder for converting input data into (1, 7) RLL code data, and a preencoder for converting the (1, 7) RLL code data from the (1, 7) RLL encoder into precode data by use of a transfer function 1/(1−D) to record it onto the medium. The reproducing unit comprises an equalizer for equalizing a regenerative signal from the medium by use of a transfer function (1+D) (1+1.5D +D$^2$), a lowpass filter for limiting an equalization signal from the equalizer to a band up to a spectrum null (spectrum zero), a maximum likelihood detector for detecting the precode data from a band limited signal from the lowpass filter, a predecoder for converting precode data detected by the maximum likelihood detector by use of a transfer function (1−D) to decode the (1, 7) RLL code data, and a (1, 7) RLL decoder for decoding original data from the (1, 7) RLL code data of the predecoder. According to the thus configured record reproduction apparatus of the present invention, there can be solved a problem of an increased error rate in a high density recording attributable to the treble enhancement in the (1, 7) EEPR4 which is a combination of an (1, 7) RLL code having an encoding rate of $\frac{2}{3}$ and a partial response PR (1,2,0,2,1), and a problem that the encoding and decoding becomes complicated in order to obviate an occurrence of a catastrophic code in the 1-7 MEEPR4 which is a combination of the (1, 7) RLL code having the encoding rate of $\frac{2}{3}$ and a partial response PR (1,1,0,−1,−1), to thereby implement a record reproduction apparatus having a higher resistance to an extinction of information caused by a heat relaxation in the high density recording.

The equalizer executing the equalization by use of the transfer function (1+D) (1+1.5D+D$^2$) comprises as in FIG. 1 an analog equalizer for equalizing the transfer function (1+1.5D+D$^2$), and a finite impulse response filter (FIR filter) for equalizing the transfer function (1+D). The lowpass filter comprises an analog lowpass filter 62. After the equalization of the transfer function (1+1.5D+D$^2$) by the analog equalizer, the analog lowpass filter 62 makes a band limitation up to a spectrum null, after which after a conversion into digital data by an A/D converter, the finite impulse response filter performs the equalization of the transfer function (1+D).

The FIR filter includes a first filter and a second filter, the first filter having a frequency characteristic gcos (3ωT/2) for regulating a boost of an equalization characteristic of the transfer function (1+1.5D+D$^2$), with a frequency characteristic F(ω) of a partial response system of the transfer function (1+D) (1+1.5D+D$^2$) being expressed by $$F(\omega)=\cos(\omega T/2)+g\cos(3\omega T/2)$$

where T is a Nyquist period and ω is a Nyquist angular frequency; and the second filter having a frequency characteristic cos (ωT/2) corresponding to the equalization of the transfer function (1+D), with a tap coefficient g of the first filter being set so as to correct unevenness in the record line density attributable to a head and the medium, to thereby achieve an equalization target of the transfer function (1+1.5D+D$^2$). The first filter has a transfer function defined including a tap coefficient g as $$(g+D+gD^2)$$

and the filter comprises two tapped delay circuits each having a delay time D, two multipliers for multiplying by the tap coefficient g, and an adder. The FIR filter modifies the transfer function (1+D) (1+1.5D+D$^2$) into $$(g+D+D^2+gD^3)$$

including a tap coefficient g, to integrate the first filter and the second filter together. Thus, the FIR is allowed to have a simplified configuration including three tapped delay circuits each having a delay time D, two multipliers for multiplying by the tap coefficient g, and an adder. A fixed equalization may be carried out in which the tap coefficient g of the finite impulse response filter is initially set to its optimum value, or alternatively, an adaptive equalization may be carried out in which the tap coefficient g of the finite impulse response filter is optimized using an algorithm of a steepest ascent or decent method such as a least mean square method. The reproducing unit further comprises a PLL circuit forming a phase loop including a phase comparator, a loop filter and a voltage controlled oscillator, whereby an equalization signal of the first filter constituting the finite impulse response filter is fed to the phase comparator of the PLL circuit to achieve a synchronization of sampling phases. The reproducing unit finds an amplitude zero level from ±2.5 level of an equalization waveform output from the equalizer upon a read of a training pattern for a plurality of periods from the medium, to thereby regulate a DC offset of the A/D converter. An offset A is added to a branch metric for use in an Euclidean distance calculation of the maximum likelihood detector, to thereby make it possible to perform a maximum likelihood detection of a partial response system between the transfer function (1+D) (1+1.5D+$D^2$) and a transfer function (1+D) (1+2D+$D^2$). This allows the maximum likelihood detector to deal with the dispersion permitted in the analog equalizer, etc., so that there is obtained substantially the same function as in the case of the regulation of the tap coefficient g of the finite impulse response filter.

The above and other objects, aspects, features and advantages of the present invention will become more apparent from the following detailed description with reference to the accompanying drawings.

BRIEF DESCRIPTION OF THE DRAWINGS

FIG. 5 is a block diagram showing a specific embodiment of the reproducing unit of FIG. 2;

DETAILED DESCRIPTION OF THE PREFERRED EMBODIMENTS

Figure 1:
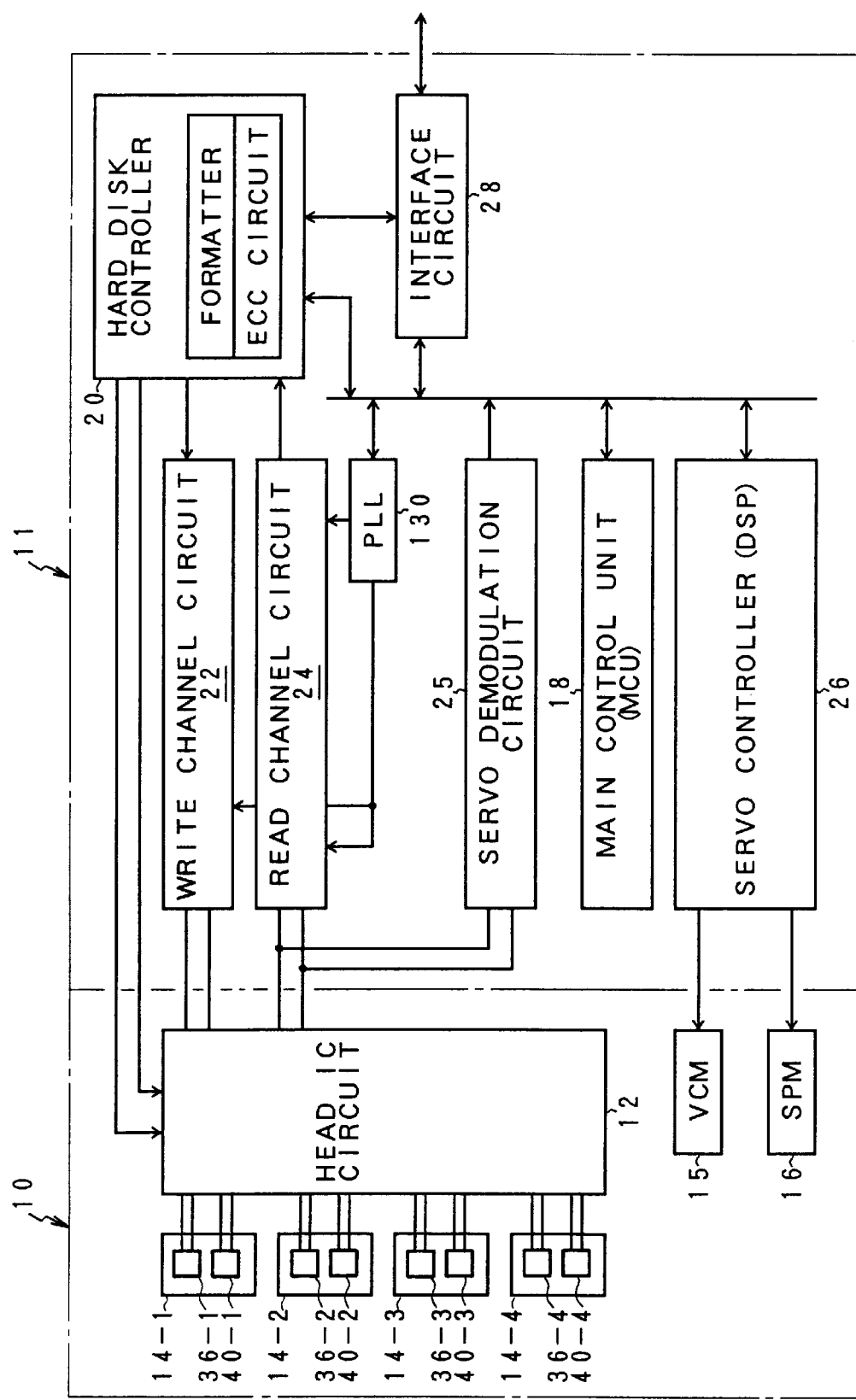
FIG. 1 is a block diagram of a magnetic disk drive to which the present invention is applied.

FIG. 1 is a block diagram of a hard disk drive constituting a record reproducing apparatus of the present invention. The hard disk drive (HDD) known as a magnetic disk apparatus comprises a disk enclosure 10 and a disk controller 11. The disk enclosure 10 comprises a head IC circuit 12 to which are connected four head assemblies 14-1 to 14-4 in this embodiment. The head assemblies 14-1 to 14-4 include respectively recording heads 36-1 to 36-4 using inductive heads and reproducing heads 40-1 to 40-4 using MR heads. The disk enclosure 10 further comprises a VCM for driving a head actuator and a spindle motor 16 for rotating a disk medium. The head IC circuit 12 of the disk enclosure 10 is associated with a write channel circuit 22 constituting a writing unit and a read channel circuit 24 constituting a reproducing unit which are provided in the disk controller 11. Associated with the write channel circuit 22 and the read channel circuit 24 is a hard disk controller 20 which incorporates therein a formatter, an ECC circuit, etc. The hard disk controller 20 is connected to an interface circuit 28 through which data transmission with an upper host is effected for a supply of write data from the host and a transfer of read data to the host. This embodiment employs a zone division constant density recording (ZCDR) method in which cylinders of the disk medium are divided into zones each consisting of predetermined number of cylinders so that different frequencies are allocated to the zones. For this reason, a PLL circuit 130 acting as a frequency synthesizer is provided for allowing a provision of a corresponding zone frequency from a cylinder address upon the read action or the write action, to thereby perform a supply of a clock to the write channel circuit 22 and the read channel circuit 24. An MPU 18 provides an entire control of the disk controller 11. To the MPU 18 are connected via a bus the hard disk controller 20 and the interface circuit 28 so that various commands from the host are received and interpreted to allow a read/write instruction to the hard disk controller 20 and a head positioning control through the drive of the VCM 15 provided in the disk enclosure 10. A servo demodulation circuit 25 and a servo controller 26 are provided in order to perform the head positioning control through the drive of the VCM 15. This embodiment employs a data face servo method for the servo information. Hence, the servo information is separated from a regenerative signal imparted to the read channel circuit 24 and is demodulated by the servo demodulation circuit 25 into head position information.

Figure 2:
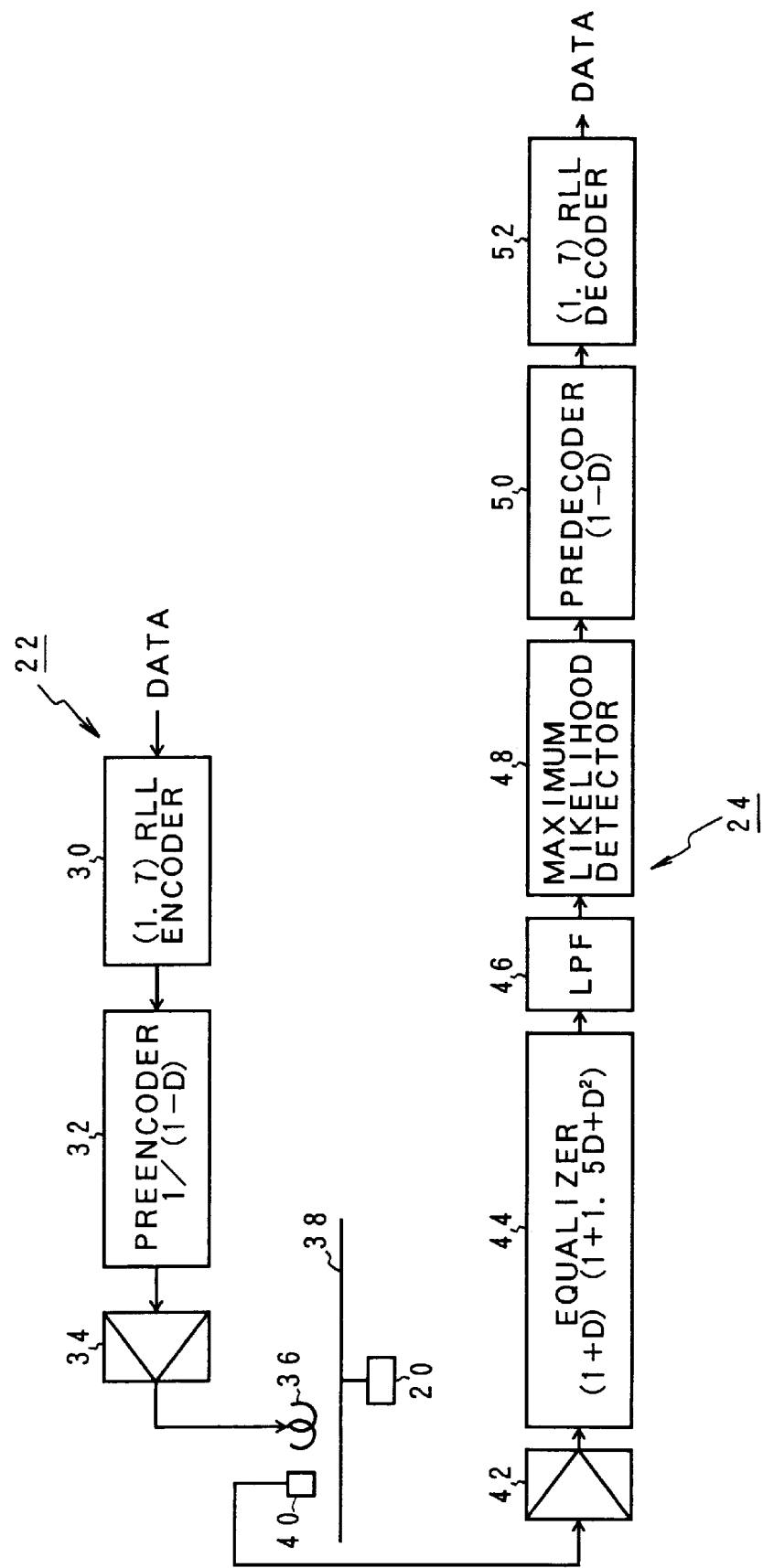
FIG. 2 is a block diagram of a basic configuration of a recording unit and a reproducing unit in accordance with the present invention.

FIG. 2 is a block diagram of a basic circuit configuration of the write channel circuit 22 and the read channel circuit 24 of FIG. 1. The write channel circuit 22 includes a (1, 7) RLL encoder 30, a preencoder 32 and a write amplifier 34. The read channel circuit 24 on the other hand includes a read amplifier 42, an equalizer 44, a lowpass filter 46, a maximum likelihood detector 48, a predecoder 50 and a (1, 7) RLL decoder 52. With respect to such a regenerating system in the present invention, a magnetic record reproduction system is regarded as a partial response system of a transfer function (1+D) (1+1.5D+D$^2$), when reading by the reproducing head 40 the information written with the recording head 36 onto the disk medium 38 rotated by the spindle motor 20, thereby providing the equalizer 44 with equalizing characteristics (frequency characteristics) corresponding to the transfer function (1+1.5D+D$^2$).

Here, a frequency characteristic F($\omega$) of the partial response system of the transfer function (1+D) (1+1.5D+D$^2$) is given as $$F(\omega) = \cos\left(\frac{\omega T}{2}\right) \cdot \left(1 + \frac{4}{3} \cdot \cos(\omega T)\right) \qquad (1)$$

Figure 3:
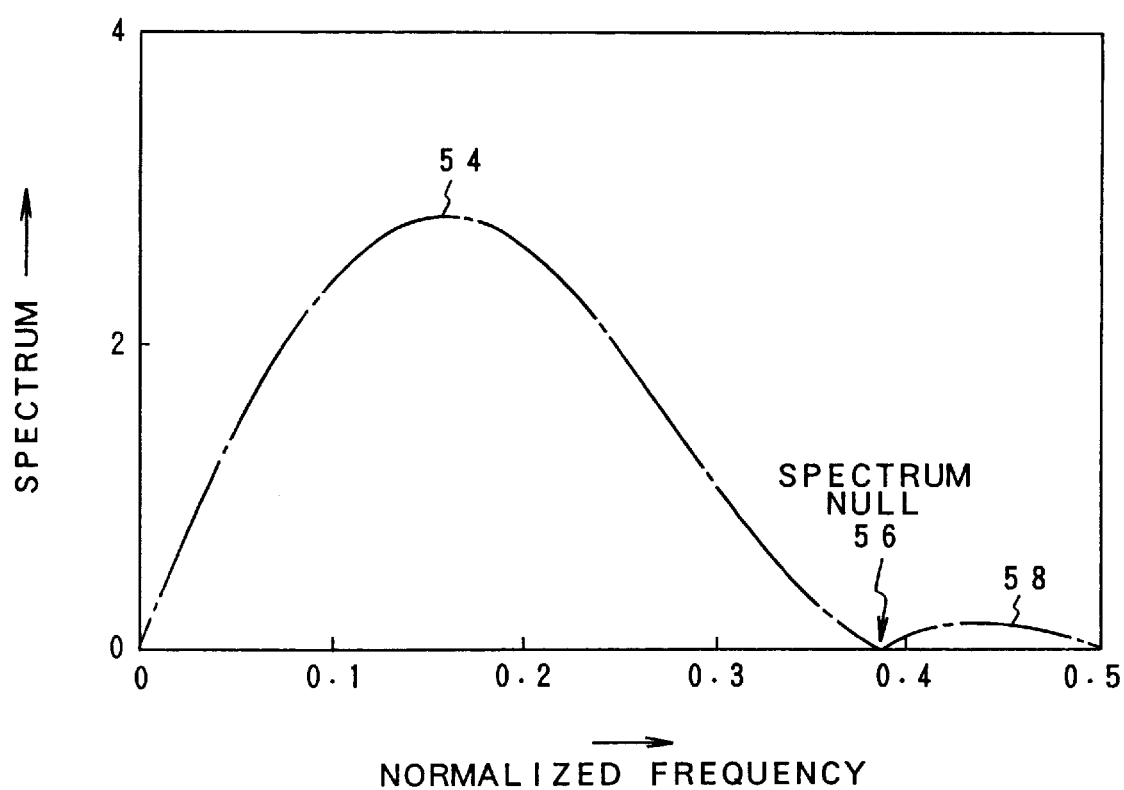
FIG. 3 is an explanatory diagram of an equalization characteristic of an equalizer for a transfer function (1+D) (1+1.5D+$D^2$) provided in the reproducing unit of FIG. 2.

When this frequency characteristic F($\omega$) is expressed in the form of a power spectrum relative to a normalized frequency of FIG. 3, characteristic curves 54 and 58 result. In the vicinity of the normalized frequency 0.38, the characteristic curves 54 and 58 of the frequency characteristic F($\omega$) have a spectrum null 56 at which the spectrum results in zero. The subsequent lowpass filter 46 executes based on the following expression a band limitation on the equalizing characteristic of the equalizer 44 as in FIG. 3 in such a manner as to eliminate a frequency component of the characteristic curve 58 exceeding the spectrum null 56 of FIG. 3.

$$0 \leq \omega \leq \frac{\cos^{-1}\left(-\frac{3}{4}\right)}{T} \qquad (2)$$

Figure 4:
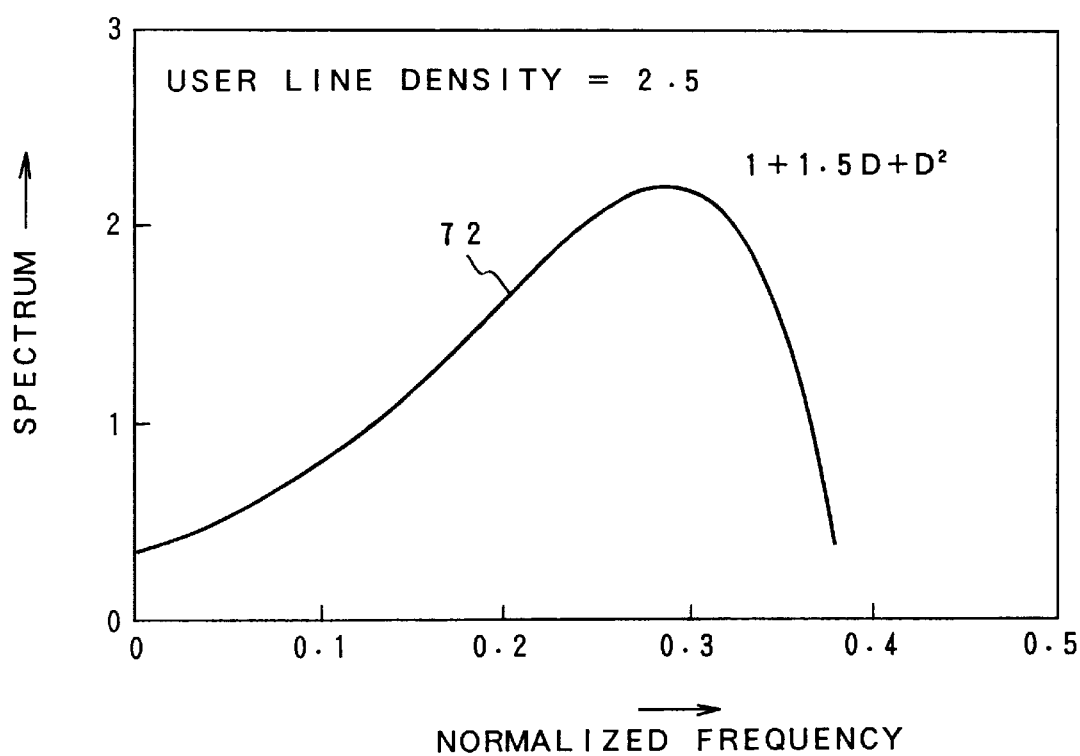
FIG. 4 is an equalization characteristic diagram of an equalizer for a transfer function (1+1.5D+$D^2$) in case a band limitation has been made at a spectrum null in the embodiment of FIG. 2.

A characteristic curve 72 of FIG. 4 represents a frequency characteristic of the equalizer 44 upon the execution of the band limitation by the lowpass filter 46 in accordance with the expression (2), with a user line density of 2.5. By realizing the characteristic curve 72 of FIG. 4 by the equalizer 44 and the lowpass filter 46 of FIG. 2, there can be realized a maximum likelihood detection of the maximum likelihood detector 48 based on the regenerative signal equalization the equalization target of which is the transfer function (1+1, 5D+D$^2$). In this case, the user line density is a normalized line density K and is defined by dividing a Nyquist period by a width at half maximum W$_{50}$ of a regenerative isolated waveform in accordance with the following expression.

K=T/W$_{50}$

This means that the user line density K=2.5 represents a regenerative waveform having a width at half maximum W$_{50}$=0.4 T.

FIG. 5 is a circuit block diagram of a specific embodiment for implementing the read channel 24 of FIG. 2. Although in the basic configuration of FIG. 2 the equalizer 44 equalizes the transfer function (1+D) (1+ 1.5D+D$^2$), in the specific embodiment of FIG. 5 an analog equalizer 60 performs the equalization of the transfer function (1+1.5D+D$^2$), after which an analog lowpass filter 62 performs the band limitation at the spectrum null 56 of FIG. 3 in accordance with the expression (2). Then the regenerative signal is converted by an A/D converter 64 into digital data and thereafter the equalization of the transfer function (1+D) is effected by an FIR filter (finite impulse response filter) 66. The other configurations are substantially the same as the basic configuration of FIG. 2.

Figure 6:
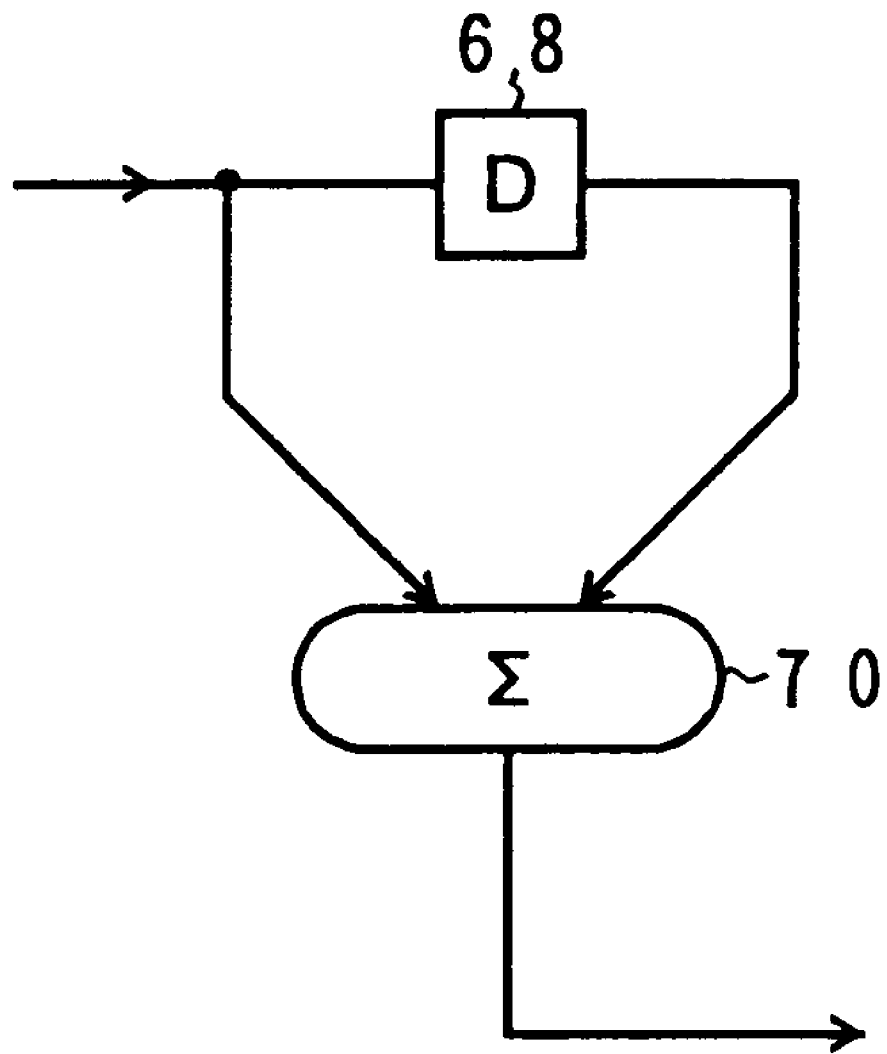
FIG. 6 is an equalization circuit diagram of a predecoder for the conversion of the transfer function (1−D) of FIG. 2.

FIG. 6 is a circuit block diagram of the FIR filter 66 of FIG. 5. This FIR filter 66 serves to perform the equalization of the transfer function (1+D) and includes a tapped delay circuit 68 and an adder 70. The tapped delay circuit 68 has a delay time D corresponding to the period T of the Nyquist frequency f=1/T. That is, the output is provided in the form of an equalization signal as a result of the equalization of the transfer function (1+D) obtained by adding by the adder 70 the delay D to the input to the tapped delay circuit 68. By performing by the analog lowpass filter 62 the band limitation up to the spectrum null shown by the expression (2) prior to the A/D conversion by the A/D converter 64 as in the embodiment of FIG. 5, it is possible to easily eliminate noises having frequencies above the Nyquist frequency and to reduce aliasing noises which may arise in the FIR filter after the A/D conversion.

Figure 7:
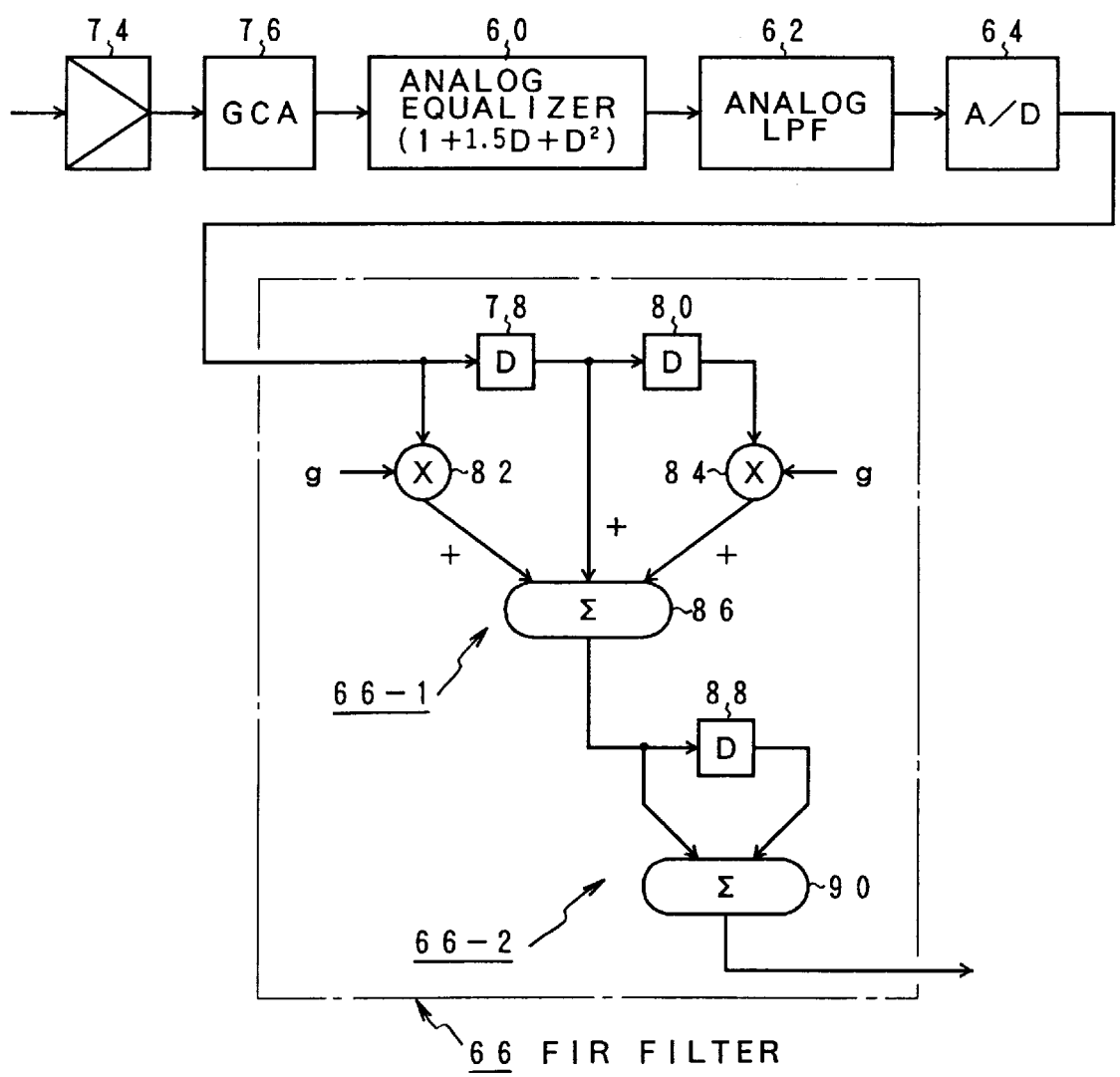
FIG. 7 is a circuit block diagram of a first embodiment of an FIR filter for the transfer function (1+D) of FIG. 5 provided with a boost filter for regulating a boost of the equalizer for the transfer function (1+1.5D+$D^2$)

FIG. 7 illustrates another embodiment of the FIR filter 66 for use in the specific embodiment of FIG. 5. The FIR filter 66 of FIG. 7 regulates the boost in the equalization characteristic to thereby acquire an equalizing waveform the equalization target of which is the transfer function (1+1.5D+D$^2$) in which there has been corrected an unevenness in the line record density on the magnetic disk medium 38 of FIG. 2 caused by the recording head 36 and the reproducing head 40. To this end, the FIR filter 66 of FIG. 7 includes a boost filter (first filter) 66-1 for the regulation of the boost and a (1+D) filter (second filter) 66-2 for the equalization of the transfer function (1+D). The boost filter 66-1 positioned at the anterior stage allows the tap coefficient g to be regulated. More specifically, the FIR filter 66 of FIG. 7 modifies as in the following expression the frequency characteristic F($\omega$) of the partial response of the transfer function (1+D) (1+1.tD+D$^2$) in accordance with the present invention given by the expression (1), to regulate the frequency characteristic F($\omega$) by use of the tap coefficient g.

$$F(\omega) = \cos\frac{\omega T}{2} + g \cdot \cos\frac{3\omega T}{2} \qquad (3)$$

The first term (1+D) of the expression (3) is obtained by the equalization of the (1+D) filter 66-2 and the second term is obtained by the equalization of the boost filter 66-1. The boost filter 66-1 at the anterior stage of the FIR filter of FIG. 7 includes two tapped delay circuits 78 and 80 which have been connected in series with each other, with an input signal to the tapped delay circuit 78 being fed to a multiplier 82 through which it is multiplied by the tap coefficient g and is imparted to an adder 86. The output of the tapped delay circuit 78 is directly provided to the adder 86 while simultaneously being fed to the subsequent tapped delay circuit 80. The output of the tapped delay circuit 80 is fed to a multiplier 84 through which it is multiplied by the tap coefficient g and is imparted to the adder 86. As a result, a transfer function H(f) provided as the output of the adder 86 is given as $$H(f) = g + D + gD^2$$
$$= 1 + 1/g + D^2$$

Here, if the transfer characteristic of the record reproduction system coincides precisely with the transfer function $(1+D)$ $(1+1.5D+D^2)$, the tap coefficient g can be equal to ⅔. In fact, however, the transfer function of the record reproduction system shifts from $(1+D)$ $(1+1.5D+D^2)$ due to the unevenness in the line density of the record reproduction system, so that the tap coefficient g is regulated corresponding to this shift, to thereby provide an optimum equalization characteristic corresponding to the shift from the equalization target.

Figure 8:
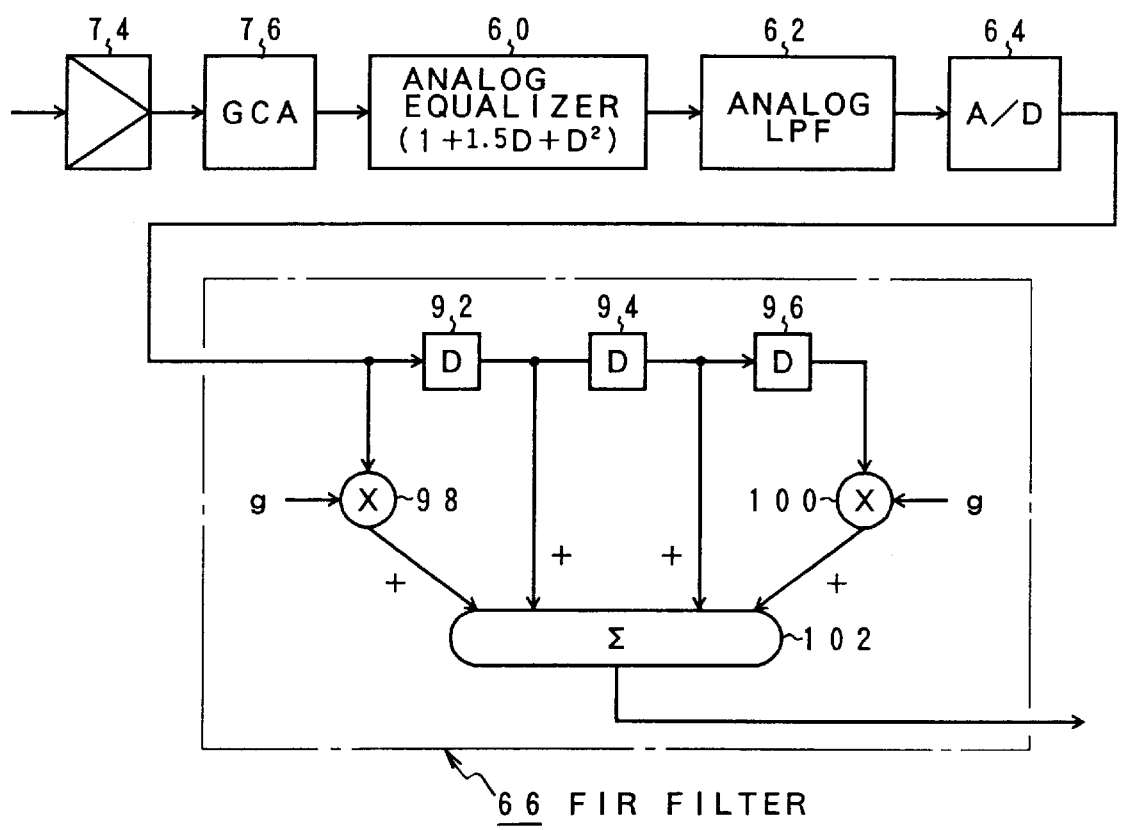
FIG. 8 is a circuit block diagram of a second embodiment of the FIR filter of FIG. 5 which is a variant of FIG. 7.

FIG. 8 illustrates another embodiment of the FIR filter 66 for use in the embodiment of FIG. 5. This embodiment is characterized by a simplified circuit configuration obtained through a modification of the FIR filter 66 of FIG. 7. In the same manner as the FIR filter 66 of FIG. 7, the FIR filter 66 of FIG. 8 is provided with the function of the boost filter 66-1 capable of regulating the tap coefficient g for the regulation of the boost and the function of the (1+D) filter 66-2 for the execution of the equalization of the transfer function (1+D), although the circuit itself integrates the two filters. More specifically, the FIR filter 66 includes tapped delay circuits 92, 94 and 96 which have been connected in series to one another, with an input signal to the tapped delay circuit 92 being multiplied by the tap coefficient g in a multiplier 98 and fed to an adder 102. The outputs of the tapped delay circuits 92 and 94 are directly fed to the adder 102. The output of the tapped delay circuit 96 at the last stage is multiplied by the tapped coefficient g in a multiplier 100 and then is fed to the adder 102. For this reason, a transfer function H(f) of an equalization signal output form the adder 102 is given as $$F(f)=g+D+D^2+gD^3$$

A modification of this expression results in $$H(f)=(1+D)\{1/(1-g)+D+gD^2/(1-g)\}=D(1+D)\ (1+(1-g)D/g+D^2)$$

It is thus understood that the first term corresponds to the (1+D) filter 66-2 of FIG. 7 and the second term corresponds to the boost filter 66-1 of FIG. 7. Here, if the transfer function of the magnetic record reproduction system is precisely $(1+D)$ $(1+1.5D+D^2)$, then the tap coefficient g set in the multipliers 98 and 100 of the FIR filter 66 of FIG. 8 is given as $$(1-g)/g=3/2$$

Naturally, in the actual apparatus there may arise a shift from the transfer function $(1+D)(1+1.5D+D^2)$ which is the equalization target due to the unevenness in the line density, so that the tap coefficient g is regulated so as to suit this, thereby making it possible to substantially realize the equalization of the equalization target $(1+D)$ $(1+1.5D+D^2)$.

Figure 9:
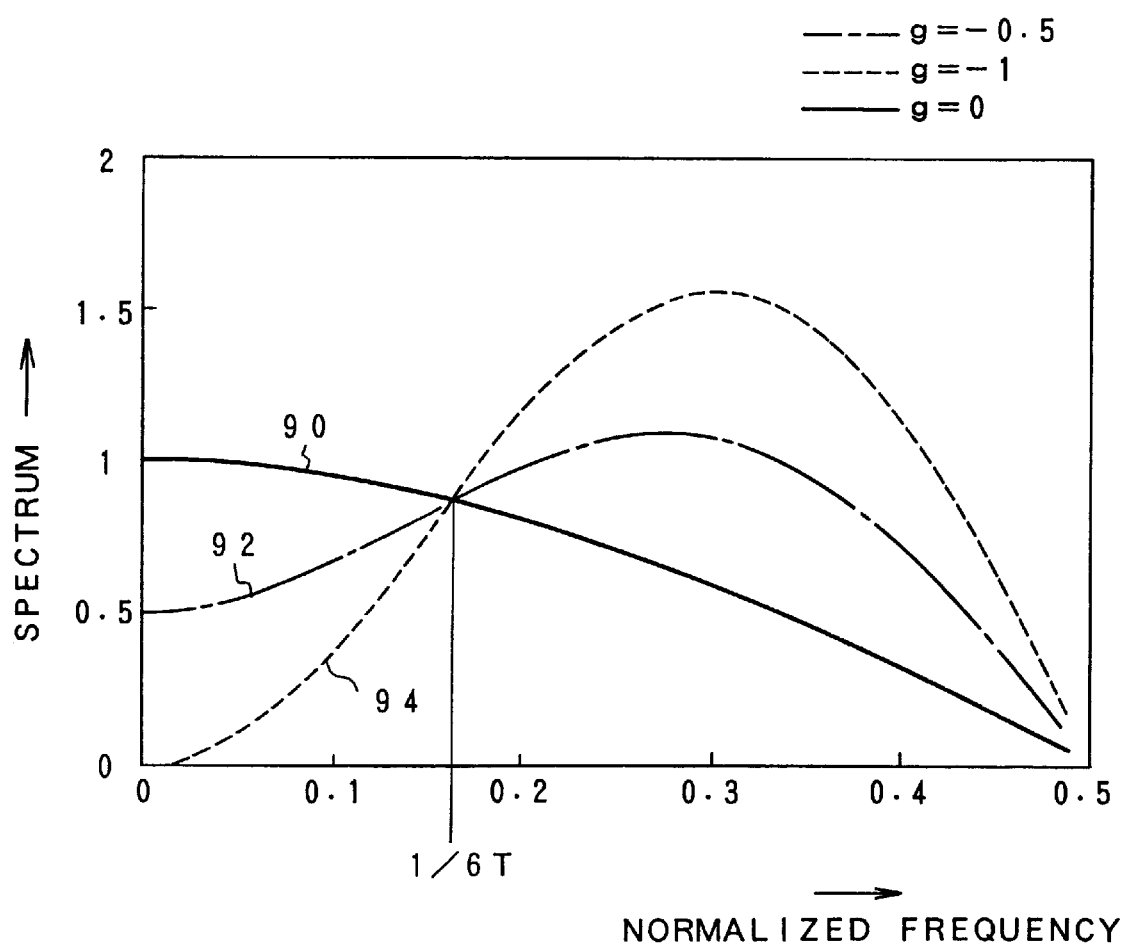
FIG. 9 is a frequency characteristic diagram of the boost in case a tap multiplier g has been varied in FIG. 7 or FIG. 8.

FIG. 9 is a frequency characteristic diagram showing variations in the boost characteristics when the tap coefficient g has been changed to g=0, g=-1, and g=-0.5 in the FIR filter 66 of FIG. 8. That is, it is possible to regulate the boost as in the characteristic curves 90, 92 and 94 by changing the tap coefficient g around a frequency ⅙ T at which there appear the most spectrum components of the (1, 7) RLL code.

Figure 10:
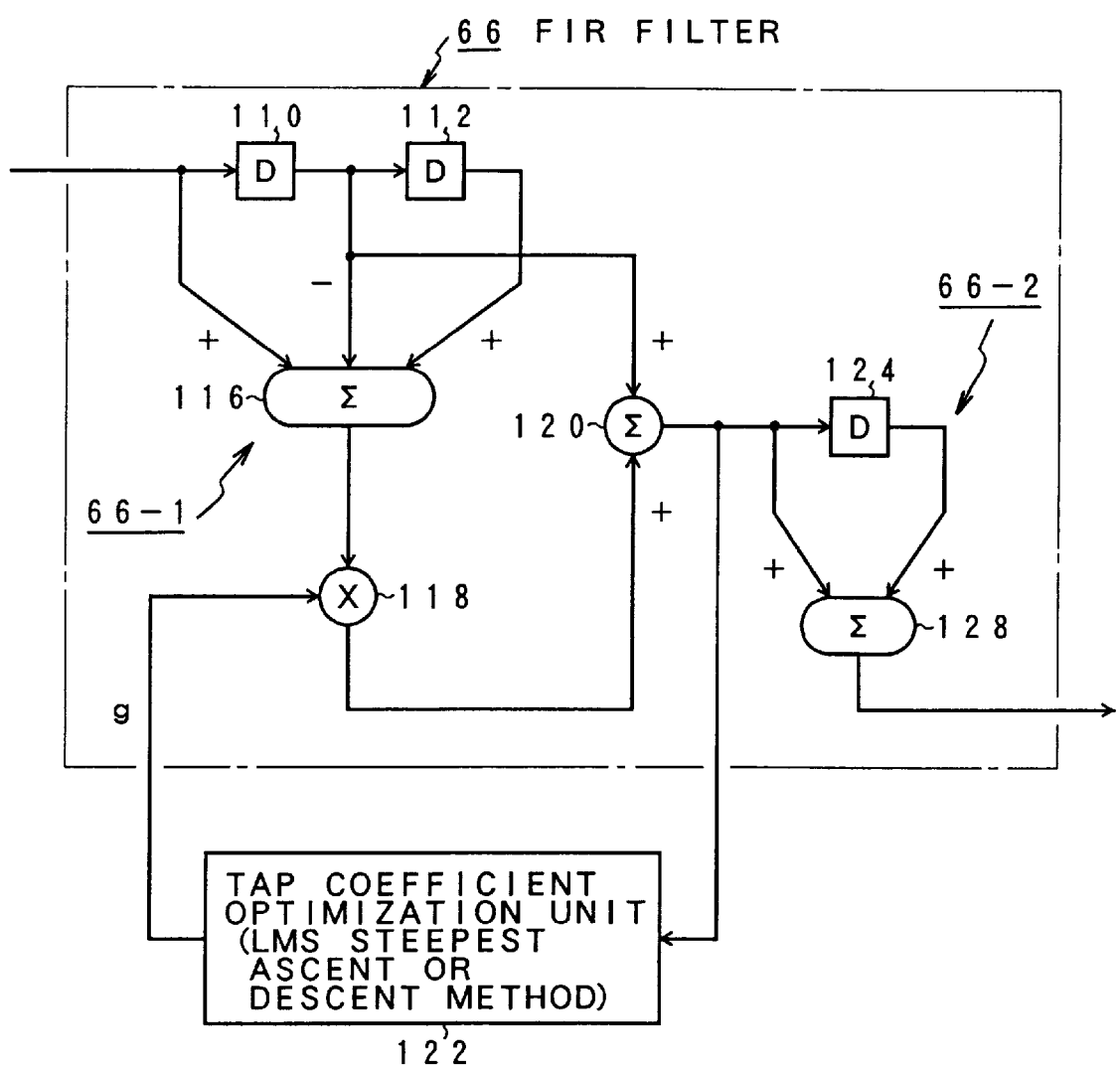
FIG. 10 is a circuit block diagram of a third embodiment of the FIR filter of FIG. 5 in which the boost is optimized by regulating the tap coefficient g by an LMS steepest ascent or decent method so that the equalization target results in a transfer function (1+1.5D+$D^2$)

FIG. 10 illustrates another embodiment of the FIR filter 66 provided in the embodiment of FIG. 5. This FIR filter 66 comprises separately the boost filter 66-1 and the (1+D) filter 66-2 in the same manner as FIG. 7. It is characterized in that the boost filter 66-1 is provided with a tap coefficient optimization unit 122 for optimizing the tap coefficient g so as to achieve the transfer function $(1+1.5D+D^2)$ as the equalization target. First, the boost filter 66-1 at the anterior stage of the FIR filter 66 includes tapped delay circuits 110 and 112 which have been connected in series to each other, with an input signal of the tapped delay circuit 110 being fed to an adder 116, and with an output signal thereof being fed as a negative signal to the adder 116, and with an output of the tapped delay circuit 112 being fed as a positive output to the adder 116. The transfer function of an equalization signal output from the adder 116 results in $(1-D+D^2)$. The output of the adder 116 is fed to a multiplier 118 in which it is multiplied by the tap coefficient g. Finally, an adder 120 adds an output D of the tapped delay circuit 110 to the output g $(1-D+D^2)$ of the multiplier 118 to impart the result to the subsequent (1+D) filter 66-2. For this reason, the transfer function H(f) of the output signal from the adder 120 which is the output stage of the boost filter 66-1 is given as $$H(f)=g(1-D+D^2)-D$$

By modifying this, $$H(f)=g-gD+D^2+D\ g+(1-g)+D+D^2$$

results. Here, if the transfer function of the record reproduction system is ideally $(1+D)$ $(1+1.5D+D^2)$, then $$1-g=3/2$$

Hence, in this case the tap coefficient g result in −0.5. Actually, the tap coefficient g is optimized by the tap coefficient optimization unit 122 of FIG. 10 so that the equalization target $(1+1.5D+D^2)$ is achieved. The tap coefficient optimization unit 122 executes for example a steepest ascent or descent algorithm based on an LMS method (least mean square algorithm) to thereby achieve the optimization. The LMS method is an algorithm for sequentially minimizing an MSE (mean squared error) defined as $(Rn-Yn)^2$. An LMS steepest ascent or descent method is processing for optimizing a tap multiplier C by applying the algorithm of the steepest ascent or descent method to this LMS method. More specifically, the tap coefficient optimization unit 122 finds the steepest ascent or descent so as to minimize an error between the output Rn of the boost filter 66-1 and its judgment value Yn from $$\Delta (Rn-Yn)^2/Cn$$

Then, the result is added by the adder to a current tap coefficient to obtain a next tap coefficient, which in turn is set in the multiplier 118. These steps are sequentially repeated to optimize the tap multiplier so that the equalization target $(1+1.5D+D^2)$ is achieved.

Figure 11:
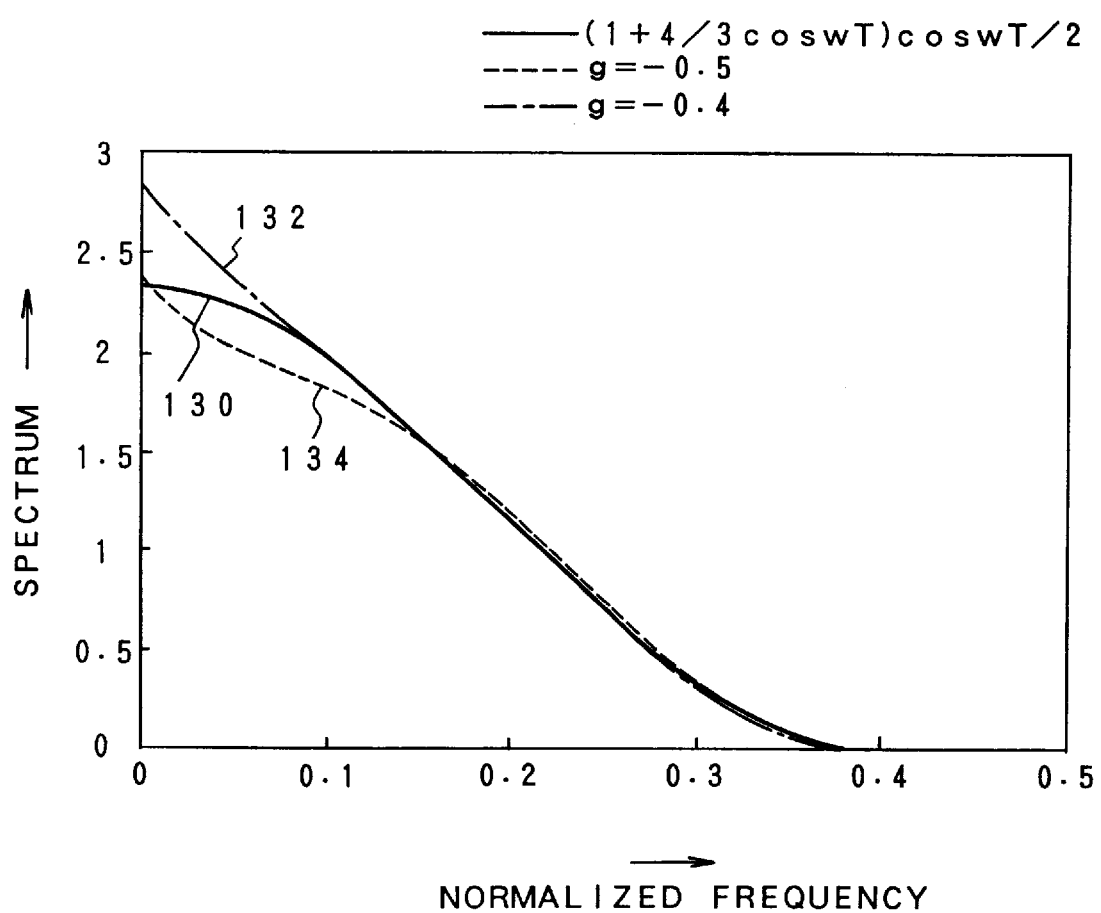
FIG. 11 is a frequency characteristic diagram of a boost filter the boost of which has been optimized in FIG. 10.

FIG. 11 illustrates frequency characteristics obtained when the transfer function $(1+D)$ $(1+1.5D+D^2)$ which is the final equalization target has been achieved by optimizing the boost with the tap coefficient g set to −0.4 or −0.5 by the tap coefficient optimizing unit 122 of the boost filter 66-1 of FIG. 10. A characteristic curve 130 represents the frequency characteristic F(ω) itself of the expression (1) in which no boost optimization is carried out. On the contrary, when the boost optimization is carried out by the tap coefficient g in FIG. 10, a characteristic curve 132 is obtained with g=−0.4, and a characteristic curve 134 is obtained with g=−0.5.

Figure 12:
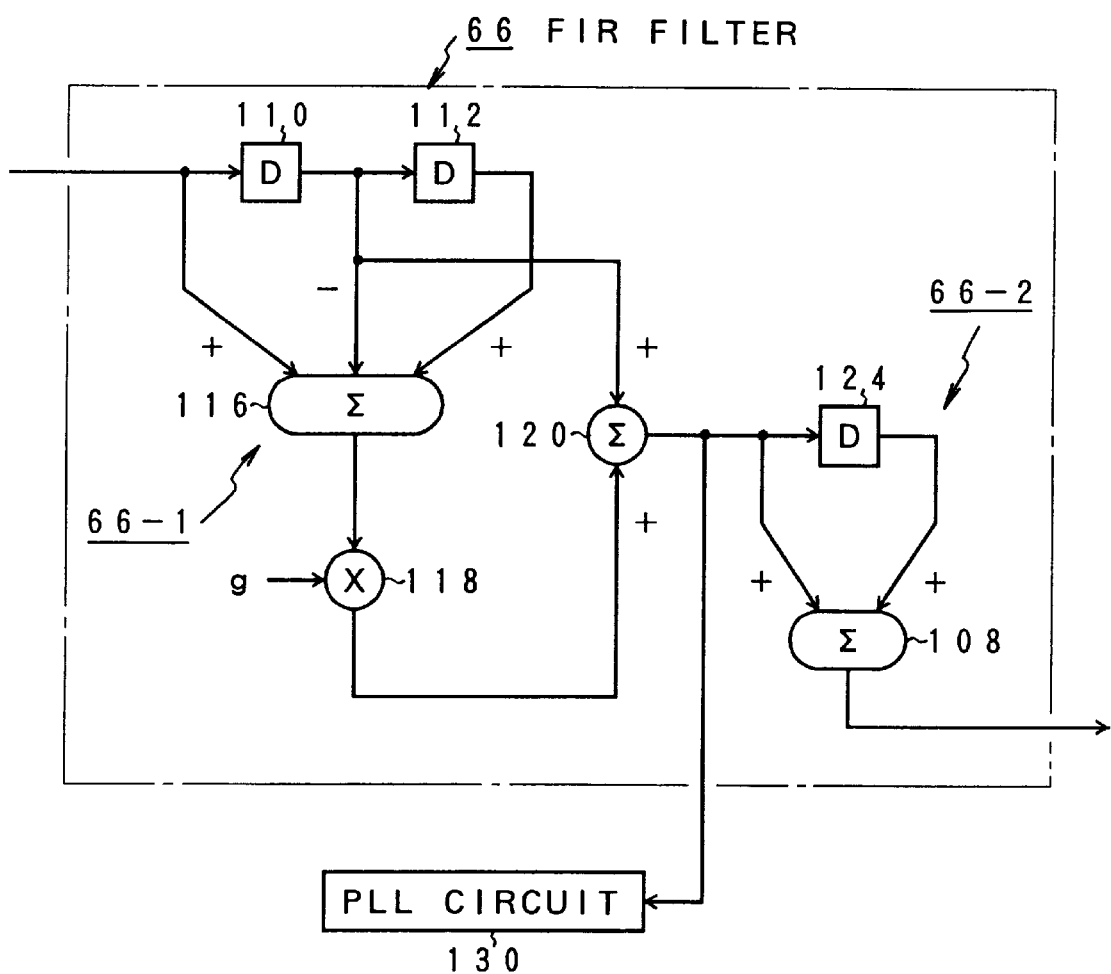
FIG. 12 is a circuit block diagram of an embodiment of the present invention for the control of a PLL circuit using an equalization signal output from the boost filter having the optimized tap coefficient.

FIG. 12 is a circuit block diagram characterized in that the loop control of a PLL circuit 130 is provided by utilizing the acquisition of the transfer function $(1+1.5D+D^2)$ which is the equalization target and in which the unevenness in the line record density of the head and the medium has been corrected by the optimization of the tap coefficient g of the boost filter 66-1 in the FIR filter of FIG. 10. The FIR filter 66 comprises the boost filter 66-1 and the (1+D) filter which have substantially the same circuit configuration as that of FIG. 10, with the tap coefficient g of the boost filter 66-1 being set to a value optimized by the tap coefficient optimization unit 122 of FIG. 11 for example. The output from the boost filter 66-1, that is, from an adder 120 is an equalization signal in which the unevenness in the line record density of the head and the medium has been corrected by the optimization of the boost through the regulation of the tap coefficient g in the boost filter 66-1 in this manner, so that an equalization waveform output from the adder 120 is fed to a PLL circuit 130 in which is created a clock synchronized with the regenerative signal. By using for the loop control of the PLL circuit 130 the equalization waveform having the optimized boost from the boost filter 66-1, the judgment levels of the equalization waveform for use in the loop control of the PLL circuit 130 can be reduced from seven different judgment levels (2.5, 1.5, 1, 0, −1, −1.5, 2.5) within ±2.5 in view of the unevenness in case the unevenness in the line record density of the head and the disk medium has not been corrected, to five different judgment levels (1.5, 1, 0, −1, −1.5) as a result of correction of the unevenness, thereby making t possible to simplify the circuit configuration.

Figure 13:
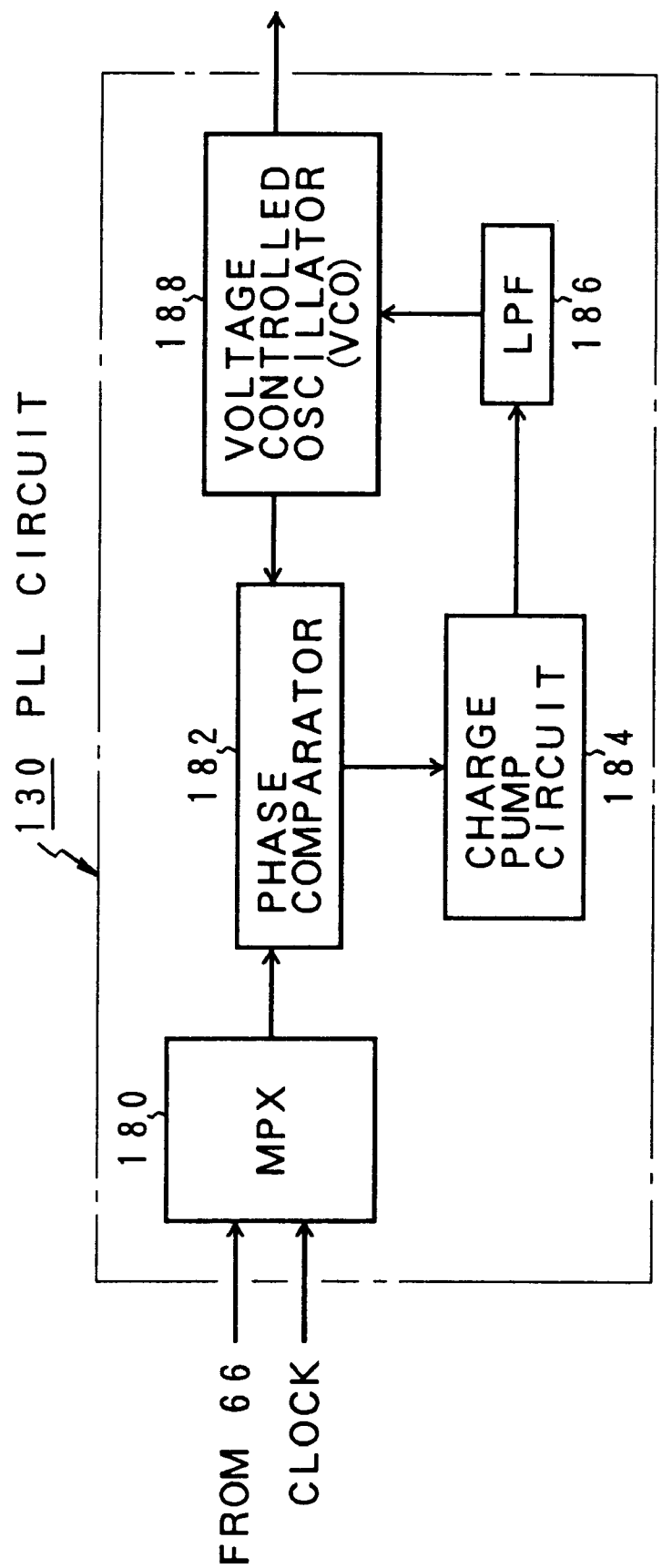
FIG. 13 is a block diagram of the PLL circuit of FIG. 12.

FIG. 13 is a block diagram of the PLL circuit 130 of FIG. 12. The PLL circuit 130 includes a multiplexer 180, a phase comparator 182, a charge pump circuit 184, a lowpass filter 186 and a voltage controlled oscillator 188. Upon the read action, that is, when a read gate is on, the multiplexer 180 selects the output from the boost filter 66-1 provided in the FIR filter 66 of FIG. 12 and feeds it to the phase comparator 182, in which the five different judgment levels (1.5, 1, 0, −1, −1.5) are used to make a phase comparison based on a level difference with the output from the voltage controlled oscillator 188 also in the five different judgment levels. The result of comparison of the phase comparator 182 is imparted to the charge pump circuit 184 and then is fed as a control signal via the lowpass filter 186 to the voltage controlled oscillator 188, thereby controlling the oscillation frequency of the voltage controlled oscillator 188 so as to be in synchronism with the phase of the regenerative signal in the form of the equalization signal from the multiplexer 180. An oscillation pulse of the voltage controlled oscillator 188 is fed as a read clock directly or after the frequency division to the read channel circuit 22. It is to be appreciated that the multiplexer 180 upon the write action, that is, when a write gate is on, isolates the FIR filter 66 and selects a clock pulse being generated by the clock oscillator to perform the PLL loop control.

Figure 14:
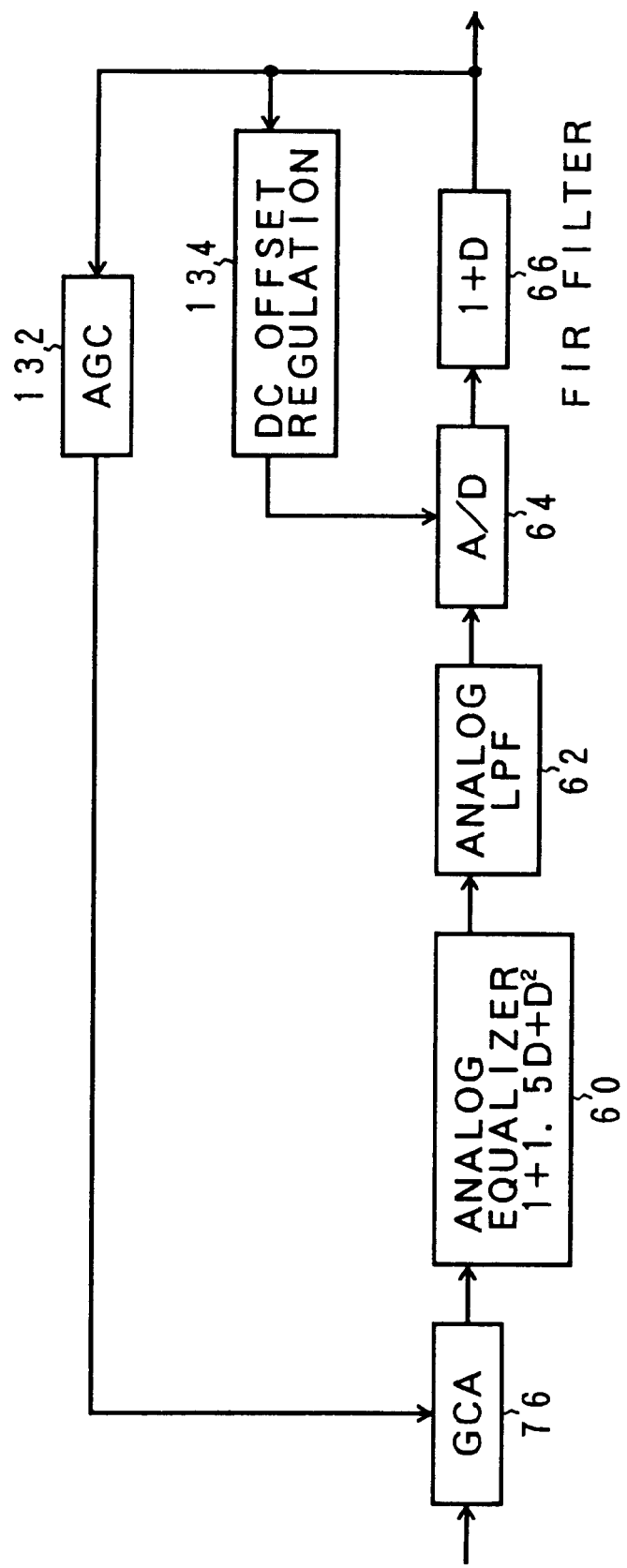
FIG. 14 is a circuit block diagram of an embodiment of the present invention in which a DC offset for an A/D conversion is regulated by use of an equalization waveform acquired though the training of the boost filter having the optimized tap coefficient.

FIG. 14 is a circuit diagram of an embodiment for regulating a DC offset of the A/D converter 64 utilizing an equalization output from the FIR filter 66 of FIG. 5. The A/D converter 64 receives an equalization waveform in the form of a regenerative signal which has undergone the equalization of the equalization target $(1+1.5D+D^2)$ by way of an automatic gain amplifier 76, the analog equalizer 60 and the analog lowpass filter 62. With the center of the amplitude of the equalization waveform being zero level, the A/D converter 64 converts an amplitude value into positive and negative data. In this case, if the zero level at the A/C converter 64 becomes inaccurate, the vertical asymmetry may get collapsed, making it difficult to convert the correct equalization waveform into digital data. In the embodiment of FIG. 14, therefore, input to an offset regulation circuit 134 is an output from the FIR filter 66 in the form of a final equalization waveform which has undergone the equalization of the transfer function $(1+D)(1+1.5D+D^2)$, so that the offset regulation circuit 134 finds for regulation a DC offset relatively providing the zero level at the A/D converter 64 from the amplitude of the equalization waveform. The offset regulation of the A/D converter 64 by the DC offset regulation unit 134 is carried out by writing training patterns for 100 periods for example with one period being 6T into a non-user area, that is, a system area on the outer side on the disk medium 38 shown in FIG. 2 in the factory regulation stage previous to the shipping of the hard disk drive and reading the training patterns to reproduce an equalization waveform for 100 periods.

Figure 15:
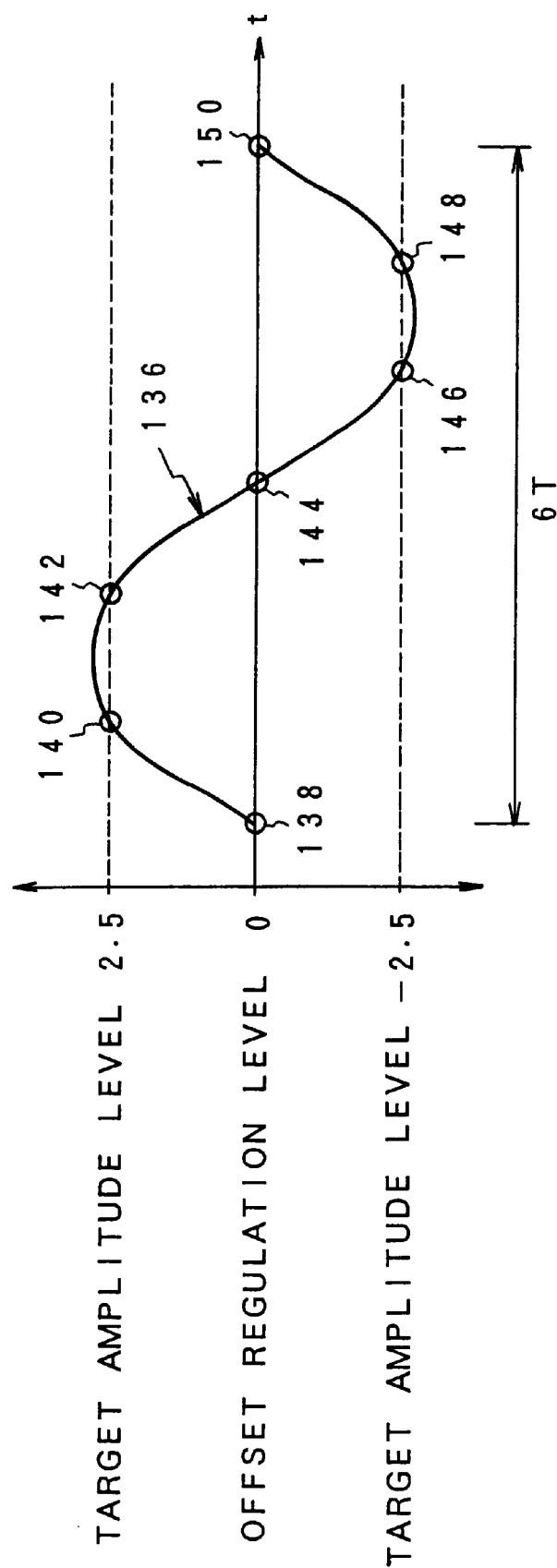
FIG. 15 is an explanatory diagram of an equalization waveform acquired through the training of FIG. 14.

FIG. 15 illustrates in an isolated manner an equalization waveform for one period input to the offset regulation unit 134. ±2.5 is set as a target amplitude level for the equalization waveform 136 to obtain sampling points 140 and 142 at the target amplitude level 2.5, as well as sampling points 146 and 148 at the target amplitude level −2.5. Averaging operation is used to calculate sampling points 138, 144 and 150 located at the midpoints between these positive and negative sampling points and forming an offset regulation level, with the thus calculated DC offset being set in the A/D converter. Upon the offset regulation, a response gain control circuit 132 for providing a response gain control signal to a gain control amplifier (GCA) 76 is also put in the operative state, so that an automatic gain control is performed so that a certain amplitude is maintained by the equalization waveform from the FIR filter 66, whereby the DC offset regulation is carried out on the basis of the repeated patterns for 100 periods. By virtue of the execution of such a regulation of the DC offset of the A/D converter 64 using an actual regenerative signal from the disk medium, the A/D converter 64 can achieve an accurate setting of the level of the sampling points of the regenerative waveform, thereby making it possible to enhance the accuracy of the maximum likelihood detection after the equalization.

Description will then be made of an embodiment for correcting a shift from the equalization target in an equalized manner by adding the offset to a branch metric operation of the maximum likelihood detector 48 instead of using the FIR filter 66, in the case where the equalization target has shifted from the transfer function $(1+D)(1+1.5D+D^2)$ of the MEEPR 4 and resulted in an equalization waveform between it and the transfer function $(1+D)(1+2D+D^2)$ of the EEPR 4 due to e.g., a circuit dispersion in the analog equalizer 60 provided in the embodiment of FIG. 5.

Figure 16:
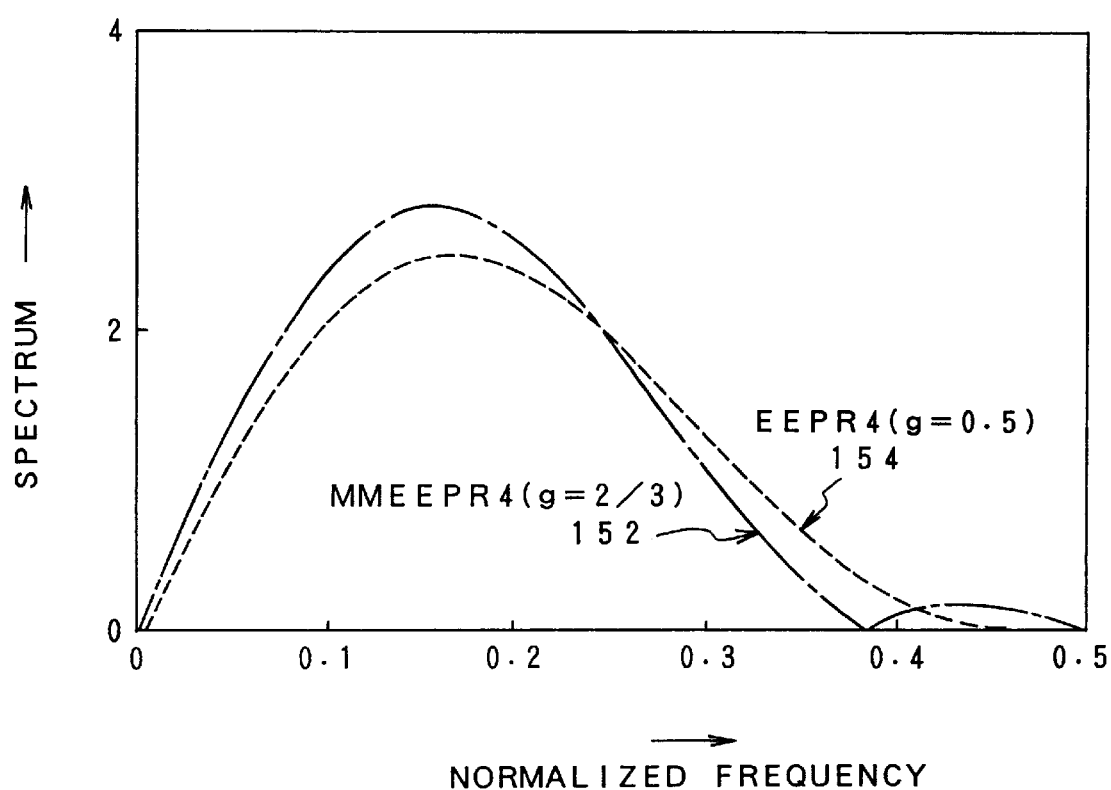
FIG. 16 is a frequency characteristic diagram of an equalization characteristic of the transfer function (1+2D+$D^2$) obtained by the reproducing unit of FIG. 2 in case the equalization target has shifted from the equalization characteristic of the transfer function (1+1.5D+$D^2$)

FIG. 16 illustrates a frequency characteristic 152 given by the expression (1) of the transfer function $(1+D)(1+1.5D+D^2)$ which is the object of the present invention, and a frequency characteristic 154 of the EEPR 4 which may result in the transfer function $(1+D)(1+2D+D^2)$ expected to have a shift from the equalization target. The frequency characteristic 152 in accordance with the equalization target of the present invention can be referred to as a so-called MMEEPR 4, and the equalization filter in this case can be implemented by setting to ⅔ the tap coefficient g in the boost filter 66-1 of FIG. 7. On the contrary, the frequency characteristic 154 expected to have a shift from the equalization target is EEPR 4 and the equalization characteristic of the transfer function $(1+D)(1+2D+D^2)$ can be implemented by setting to 0.5 the tap coefficient g in the configuration of the boost filter 66-1 of FIG. 7. Such a shift toward the frequency characteristic 154 from the frequency characteristic 152 which is the equalization target in the present invention is substantially corrected in the maximum likelihood detector 48 of FIG. 17 by adding an offset A to the branch metric Bn used in a distribution path judgment unit 160. The maximum likelihood detector 48 includes the distribution path judgment unit 160 known as an ad compare select circuit and a path memory 162. The judgment processing of the distribution path judgment unit 160 is performed in accordance with a transition state diagram of FIG. 18. This transition state diagram represents the maximum likelihood detection through the equalization of the frequency characteristic 152 having the equalization target of the transfer function $(1+1.5D+D^2)$ of the present invention shown in FIG. 18 in the case of the tap coefficient $g=\frac{2}{3}$. Since the constraint length m of a concatenation code (convolution code) Yn obtained from the regenerative signal is 4, the state transition of the MMEEPR4 originally gives rise to $2^4=16$ states 0000 to 1111, among which it is limited to 10 states with the exclusion of 0010, 0100, 0101, 1010, 1011, 1101.

Figure 17:
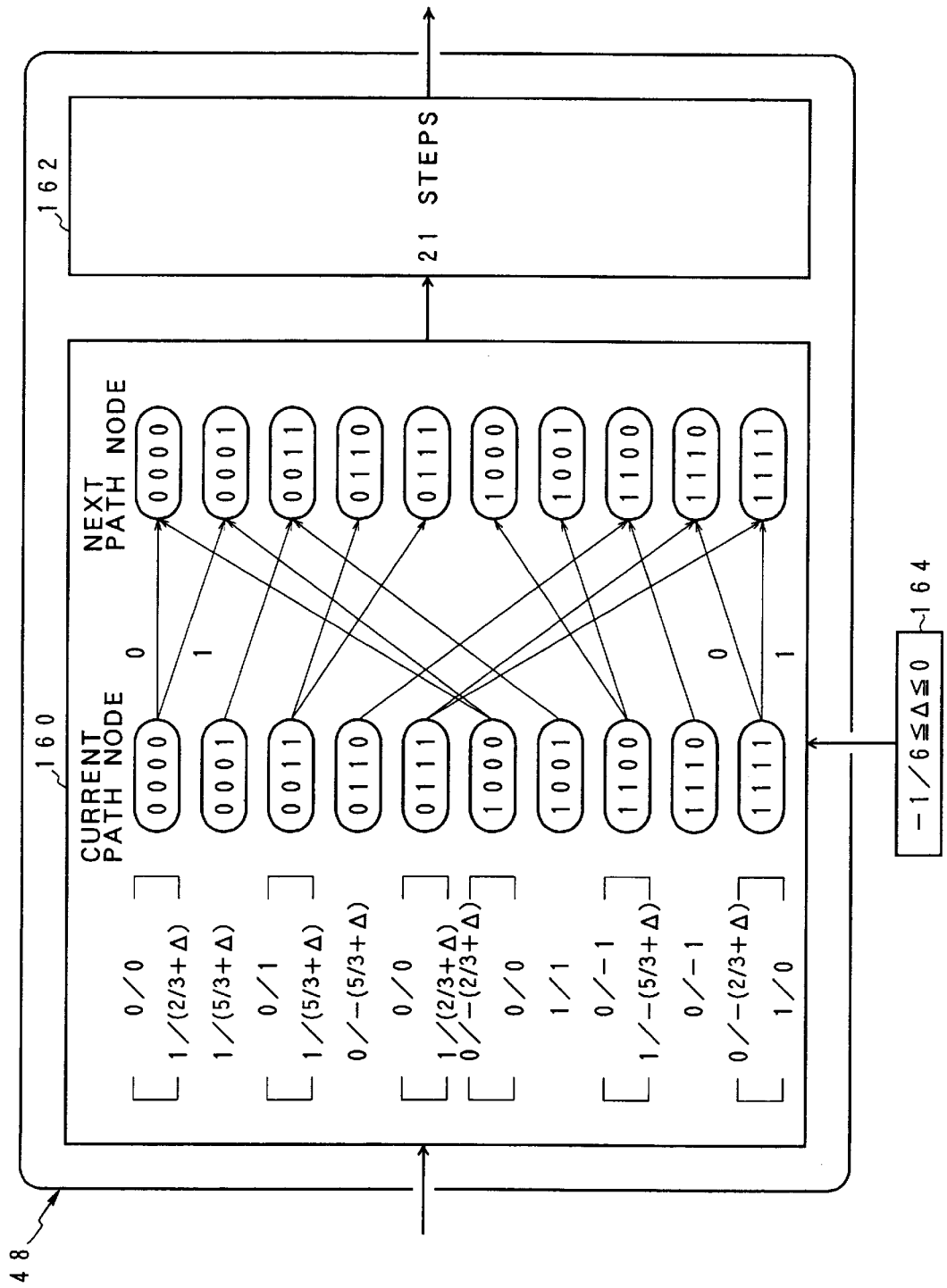
FIG. 17 is a block diagram of another embodiment of the present invention in which the shift from the equalization target of FIG. 16 is corrected by adding an offset to a branch metric of the maximum likelihood detection without using the boost filter.
Figure 18:
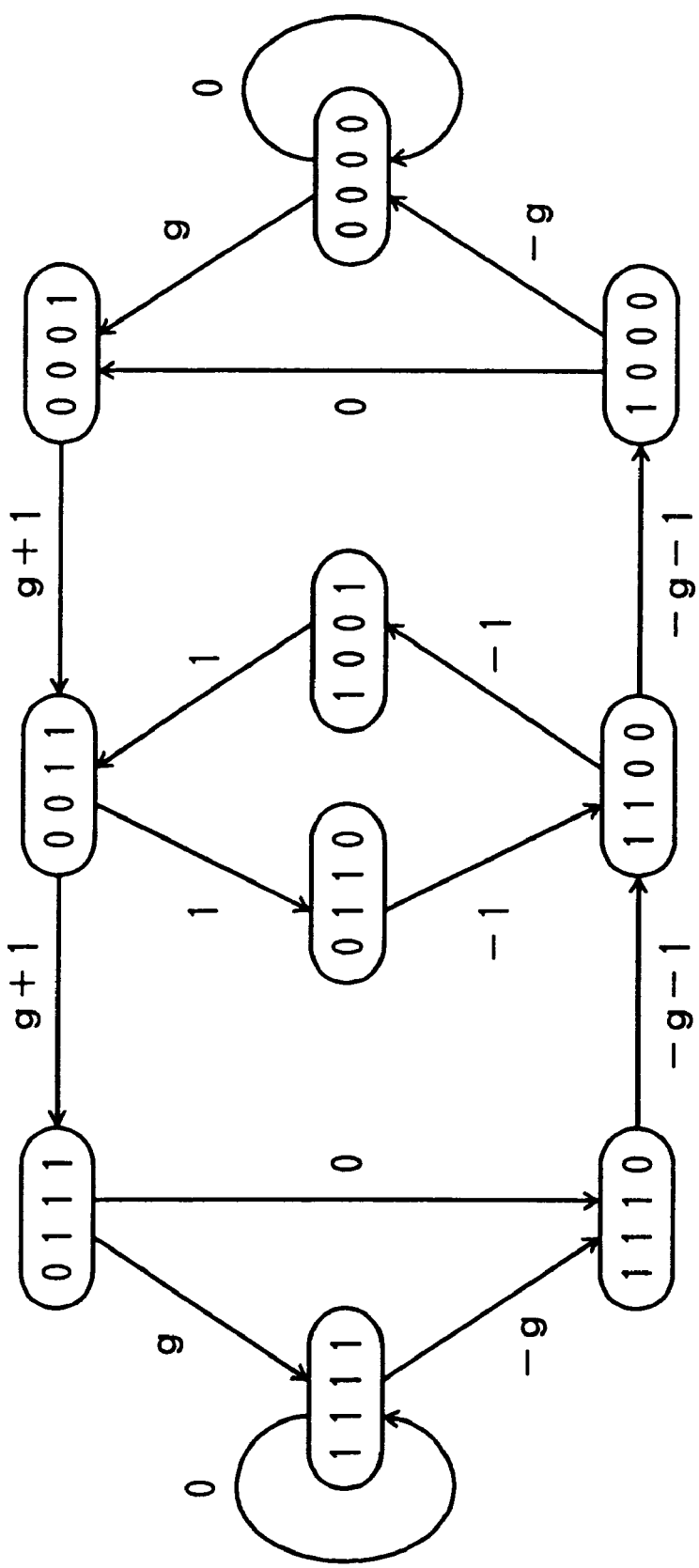
FIG. 18 is a state transition diagram of a maximum likelihood detector of FIG. 17.

The distribution path judgment unit 160 of FIG. 17 will be described in greater detail. On the basis of the state transition of the partial response maximum likelihood detection of the MMEEPR 4 of FIG. 18 there are shown noiseless ideal estimation values Yn associated with the input information bits 0 and 1 in a manner corresponding to the ten current path nodes 0000 to 1111, with the distribution judgment unit 160 located on the left side. In the case of the current node 0000 for example, when the information bit is 0, the estimated value Yn is 0, which is represented as "0/0". When the information bit is 1, the estimated value Yn is $\frac{2}{3}$, which is represented as "1/($\frac{2}{3}$)". Here, the node values 0000 to 1111 are metric values of the path nodes. On the right side of the current path nodes there appear ten path nodes 0000 to 1111 by the input of the next information bit 0/1. This next path nodes are each linked with the last path nodes by way of two or one path. In the case of the next path nodes 0000 for example, it is linked with the last path nodes 0000 and 1000 by way of respective paths. From the two paths extending from the last path nodes, a likely path is judged and selected as a survivor path. For the selection of the path, respective branch metrics (Euclidean distances) Bn are calculated on the basis of two noiseless ideal values Yn of the MEEPR4 corresponding to the regenerative signal sampling values Rn and the information bit 0/1, from the following expression.

$$Bn=(Rn-Yn)^2$$

Then each branch metric value Bn and the path metric values input from the last path nodes are added together to select a smaller one of the two addition values, with the metric value of the finally selected maximum likelihood path nodes being provided as an output to the path memory 162. According to the present invention, an offset $f\cancel{c}$ is added for correction to the ideal estimated value Yn of the MEEPR4 in the distribution path judgment unit 160, to thereby prevent a judgment error which may be caused by a shift of the equalization target from the MEEPR4 toward the EEPR4 as in FIG. 16 attributable to the dispersion of the analog equalizer 60. When the equalization target of the transfer function $(1+D)(1+1.5D+D^2)$ in accordance with the present invention shifts toward the equalization target of the frequency characteristic 154 of the transfer function $(1+D)(1+2D+D^2)$ on the EEPR 4 side as in FIG. 16, the tap coefficient g of FIG. 18 shifts from $\frac{2}{3}$ toward 0.5, with the result that a judgment error becomes liable to occur at the ideal estimated value Yn of the MMEEPR 4 provided in the distribution path judgment unit 160 of FIG. 17. Therefore, an offset value A corresponding to a variance in the tap coefficient g of FIG. 17 is set by the offset setting unit 164 so that the offset value A is added to the ideal estimated value Yn for use in the calculation of the branch metric Bn to reduce the same. This allows a correction of the calculation of the branch metric Bn corresponding to the shift from the frequency characteristic 152 toward the frequency characteristic 154 of FIG. 16 to be performed, making it possible to prevent a judgment error of the maximum likelihood detection attributable to the shift of the equalization target. The offset value A for correcting the ideal estimated value Yn used in this case can be within the following range.

$$-\tfrac{1}{6} \leq A \leq 0$$

According to the present invention as described hereinbefore, there can be solved the problem of the treble boost in the (1, 7) EEPR 4 and the problem that the code/decode for obviating the catastrophic code in the (1, 7) MEEPR4 may become complicated, making it possible to implement a record reproduction apparatus ensuring a maximum likelihood detection based on the equalization of the transfer function $(1+D)(1+1.5D+D^2)$ having a higher resistance to the extinction of the information attributable to the heat relaxation in the high density recording.

Although the equalization of the transfer function $(1+D)(1+1.5D+D^2)$ has a frequency characteristic at the spectrum null, the equalization is carried out with the band limitation at the spectrum null in such a manner that the equalization target can be achieved without causing any degradation in the equalization performance in spite of the execution of the band limitation. It also allows an effective and easy design of the equalization circuit.

It is to be appreciated that the present invention is not limited to the above embodiments but may employ any appropriate configuration as long as it provides a reproducing unit capable of achieving the equalization of the transfer function $(1+D)(1+1.5D+D^2)$. It is also appreciated that the present invention is not restricted by the numerical values shown in the embodiments of the present invention, and that it could variously be modified in an appropriate manner without impairing the objects and advantages of the present invention.

What is claimed is:

1. A record reproduction apparatus for recording and reproducing information on/from a magnetic recording system represented by a partial response system, said apparatus having a recording unit and a reproducing unit, said recording unit comprising:

a (1, 7) RLL encoder for converting input data into (1, 7) RLL code data; and a preencoder for converting said (1, 7) RLL code data from said (1, 7) RLL encoder into precode data by use of a transfer function 1/(1−D) to record it onto said medium;

said reproducing unit comprising:

an equalizer for equalizing a regenerative signal from said medium by use of a transfer function $(1+D)(1+1.5D+D^2)$;

a lowpass filter for limiting an equalization signal from said equalizer to a band up to a spectrum null;

a maximum likelihood detector for detecting said precode data from a band limited signal from said lowpass filter;

a predecoder for converting precode data detected by said maximum likelihood detector by use of a transfer function (1−D) to decode said (1, 7) RLL code data; and a (1, 7) RLL decoder for decoding original data from said (1, 7) RLL code data of said predecoder.

2. An apparatus according to claim 1, wherein said equalizer comprises an analog equalizer for equalizing said transfer function $(1+1.5D+D^2)$, and a finite impulse response filter for equalizing said transfer function $(1+D)$, and wherein said lowpass filter comprises an analog lowpass filter, and wherein after the equalization of said transfer function $(1+1.5D+D^2)$ by said analog equalizer, said analog lowpass filter makes a band limitation up to a spectrum null, after which after a conversion into digital data by an A/D converter, said finite impulse response filter performs the equalization of said transfer function $(1+D)$.

3. An apparatus according to claim 2, wherein said finite impulse response filter includes a first filter and a second filter, said first filter having a frequency characteristic gcos $(3\omega T/2)$ for regulating a boost of an equalization characteristic of said transfer function $(1+1.5D+D^2)$, with a frequency characteristic $F(\omega)$ of a partial response system of said transfer function $(1+D)$ $(1+1.5D+D^2)$ being expressed by $$F(\omega)= \cos\,(\omega T/2)+ \text{gcos}\,(3\omega T/2)$$

where T is a Nyquist period and $\omega$ is a Nyquist angular frequency; and said second filter having a frequency characteristic cos $(\omega T/2)$ corresponding to the equalization of said transfer function $(1+D)$, and wherein a tap coefficient g of said first filter is set so as to correct unevenness in the record line density attributable to a head and said medium, to thereby achieve an equalization target of said transfer function $(1+1.5D+D^2)$.

4. An apparatus according to claim 3, wherein said first filter has a transfer function defined including a tap coefficient g as $$(g+D+gD^2)$$

and wherein said filter comprises two tapped delay circuits each having a delay time D, two multipliers for multiplying by said tap coefficient g, and an adder.

5. An apparatus according to claim 3, wherein said finite impulse response filter modifies said transfer function $(1+D)$ $(1+1.5D+D^2)$ into $$(g+D+D^2+gD^3)$$

including a tap coefficient g, to integrate said first filter and said second filter together, said finite impulse response filter comprising three tapped delay circuits each having a delay time D, two multipliers for multiplying by said tap coefficient g, and an adder.

6. An apparatus according to claim 4 or 5, wherein a fixed equalization is carried out in which said tap coefficient g of said finite impulse response filter is initially set to its optimum value.

7. An apparatus according to claim 4 or 5, wherein an adaptive equalization is carried out in which said tap coefficient g of said finite impulse response filter is optimized using an algorithm of a steepest ascent or decent method such as a least mean square method.

8. An apparatus according to claim 3, wherein said reproducing unit further comprises a PLL circuit forming a phase loop including a phase comparator, a loop filter and a voltage controlled oscillator, whereby an equalization signal of said first filter constituting said finite impulse response filter is fed to said phase comparator of said PLL circuit to achieve a synchronization of sampling phases.

9. An apparatus according to claim 2, wherein said reproducing unit finds an amplitude zero level from ±2.5 level of an equalization waveform output from said equalizer upon a read of a training pattern for a plurality of periods from said medium, to thereby regulate a DC offset of said A/D converter.

10. An apparatus according to claim 1, wherein an offset $\Delta$ is added to a branch metric for use in an Euclidean distance calculation of said maximum likelihood detector, to thereby make it possible to perform a maximum likelihood detection of a partial response system between said transfer function $(1+D)$ $(1+1.5D+D^2)$ and a transfer function $(1+D)$ $(1+2D+D^2)$.

11. An apparatus according to claim 10, wherein said offset $\Delta$ added to said branch metric for use in said Euclidean distance calculation of said maximum likelihood detection is a value within a range $$(-1/6)\leq\Delta\leq 0$$

* * * * *